United States Patent
Jiang

(10) Patent No.: US 12,549,974 B2
(45) Date of Patent: Feb. 10, 2026

(54) METHOD AND APPARATUS FOR DETECTING IDC, AND METHOD AND APPARATUS FOR INDICATING IDC DETECTION

(71) Applicant: XIAOMI COMMUNICATIONS CO., LTD., Beijing (CN)

(72) Inventor: Xiaowei Jiang, Beijing (CN)

(73) Assignee: XIAOMI COMMUNICATIONS CO., LTD., Beijing (CN)

(*) Notice: Subject to any disclaimer, the term of this patent is extended or adjusted under 35 U.S.C. 154(b) by 438 days.

(21) Appl. No.: 17/639,867

(22) PCT Filed: Sep. 3, 2019

(86) PCT No.: PCT/CN2019/104243
§ 371 (c)(1),
(2) Date: Mar. 2, 2022

(87) PCT Pub. No.: WO2021/042272
PCT Pub. Date: Mar. 11, 2021

(65) Prior Publication Data
US 2022/0338037 A1 Oct. 20, 2022

(51) Int. Cl.
*H04W 24/08* (2009.01)
*H04J 11/00* (2006.01)
(Continued)

(52) U.S. Cl.
CPC .......... *H04W 24/08* (2013.01); *H04W 16/14* (2013.01)

(58) Field of Classification Search
CPC ............................. H04W 24/08; H04W 16/14
(Continued)

(56) References Cited

U.S. PATENT DOCUMENTS

2013/0195013 A1* 8/2013 Ahn ................ H04W 72/1215
370/328
2013/0322260 A1* 12/2013 Yao ........................ H04W 24/10
370/241
(Continued)

FOREIGN PATENT DOCUMENTS

| CN | 103249076 A | 8/2013 |
|---|---|---|
| CN | 103988536 A | 8/2014 |

(Continued)

OTHER PUBLICATIONS

PCT/CN2019/104243 English translation of International Search Report dated May 27, 2020, 3 pages.
(Continued)

*Primary Examiner* — Xuan Lu
(74) *Attorney, Agent, or Firm* — Cozen O'Connor

(57) ABSTRACT

A method for detecting IDC. The method includes: determining, according to frequency point indication information sent by a base station, a carrier frequency point to be detected that needs IDC detection; determining, according to bandwidth indication information sent by the base station, a bandwidth to be detected corresponding to the carrier frequency point to be detected; determining, according to the carrier frequency point to be detected and the bandwidth to be detected, a frequency band to be detected; and detecting whether IDC exists or is to occur in the frequency band to be detected.

12 Claims, 7 Drawing Sheets

(51) Int. Cl.
H04W 16/14 (2009.01)
H04W 24/00 (2009.01)
H04W 72/12 (2023.01)
H04W 88/06 (2009.01)

(58) Field of Classification Search
USPC .......................................................... 370/252
See application file for complete search history.

(56) References Cited

U.S. PATENT DOCUMENTS

| | | | | |
|---|---|---|---|---|
| 2014/0056169 | A1* | 2/2014 | Jung | H04W 24/08 370/252 |
| 2015/0124676 | A1* | 5/2015 | Song | H04L 5/0073 370/330 |
| 2015/0215944 | A1* | 7/2015 | Kim | H04L 5/001 370/329 |
| 2017/0094676 | A1* | 3/2017 | Kim | H04W 72/12 |
| 2017/0181172 | A1* | 6/2017 | Susitaival | H04W 72/0453 |
| 2019/0182870 | A1* | 6/2019 | Shih | H04W 72/23 |
| 2021/0185645 | A1* | 6/2021 | Huang | H04W 76/11 |
| 2022/0167280 | A1* | 5/2022 | Ding | H04W 36/06 |
| 2022/0346109 | A1* | 10/2022 | Cheng | H04W 72/542 |

FOREIGN PATENT DOCUMENTS

| | | |
|---|---|---|
| CN | 108934041 A | 12/2018 |
| WO | WO 2012093901 A1 | 7/2012 |

OTHER PUBLICATIONS

Chinese Patent Application No. 201980001884.3, Office Action dated Aug. 12, 2022, 5 pages.
Chinese Patent Application No. 201980001884.3, English translation of Office Action dated Aug. 12, 2022, 8 pages.
European Patent Application No. 19944517.2, Search and Opinion dated May 12, 2023, 12 pages.
Samsung "IDC reporting with NR" 3GPP TSG-RAN WG2 meeting #103 bis, R2-1814751, Oct. 2018, 3 pages.
Indian Patent Application No. 202247019916, Office Action dated Aug. 12, 2022, 7 pages.

* cited by examiner

METHOD AND APPARATUS FOR DETECTING IDC, AND METHOD AND APPARATUS FOR INDICATING IDC DETECTION

CROSS-REFERENCE TO RELATED APPLICATION

This application is the US national phase application of International Application No. PCT/CN2019/104243, filed on Sep. 3, 2019, the entire contents of which are incorporated herein by reference.

TECHNICAL FIELD

The disclosure relates to the field of communication technology, in particular to a method for detecting in-device coexistence (IDC), a method for indicating IDC detection, an apparatus for detecting IDC, an apparatus for indicating IDC detection, an electronic device, and a computer readable storage medium.

BACKGROUND

At present, terminals can communicate based on various networks, and signals between different networks may cause interference, resulting in failure for the terminals to communicate normally.

To solve this problem, a solution for in-device coexistence (IDC) is introduced. Specifically, when IDC occurs in a terminal and the terminal itself cannot solve the IDC, the terminal reports IDC indication information to a base station, so that the base station can determine the carrier frequency that causes the interference or the carrier frequency that is suffering from the interference.

SUMMARY

According to a first aspect of the disclosure, a method for detecting IDC is disclosed. The method is performed by a terminal, and includes:
  determining a carrier frequency point to be detected that needs IDC detection according to frequency point indication information sent by a base station;
  determining a bandwidth to be detected corresponding to the carrier frequency point to be detected according to bandwidth indication information sent by the base station;
  determining a frequency band to be detected according to the carrier frequency point to be detected and the bandwidth to be detected;
  detecting whether IDC exists or is to occur in the frequency band to be detected.

According to a second aspect of the present disclosure, a method for indicating IDC detection is disclosed. The method is performed by a base station, and includes:
  sending frequency point indication information and bandwidth indication information to a terminal, wherein the frequency point indication information is configured to indicate a carrier frequency point to be detected that needs IDC detection, and the bandwidth indication information is configured to indicate a frequency band to be detected corresponding to the carrier frequency point to be detected.

According to a third aspect of embodiments of the present disclosure, an electronic device is disclosed, including:
  a processor; and
  a memory configured to store instructions executable by a processor; wherein,
  the processor is configured to implement the method for detecting IDC described in any above embodiment.

According to a fourth aspect of embodiments of the present disclosure, an electronic device is disclosed, including:
  a processor;
  a memory configured to store instructions executable by a processor; wherein,
  the processor is configured to implement the method for indicating IDC detection described in any above embodiment.

BRIEF DESCRIPTION OF THE DRAWINGS

In order to illustrate the technical solutions in embodiments of the present disclosure more clearly, the following briefly introduces the accompanying drawings that need to be used in the description of the embodiments. Obviously, the accompanying drawings in the following description are only some embodiments of the present disclosure. For those of ordinary skill in the art, other drawings can also be obtained according to these drawings without creative labor.

DETAILED DESCRIPTION

The technical solutions in embodiments of the present disclosure will be clearly and completely described below with reference to the accompanying drawings in embodiments of the present disclosure. Obviously, the described embodiments are only a part of embodiments of the present disclosure, rather than all the embodiments. Based on the embodiments in the present disclosure, all other embodiments obtained by those of ordinary skill in the art without creative efforts shall fall within the protection scope of the present disclosure.

At present, for an LTE (Long Term Evolution) carrier, a terminal determines whether there is a carrier frequency point to be detected for IDC according to measurement configuration of an LTE base station. However, when the terminal works in an EN-DC (LTE-NR dual connectivity, NR refers to new air interface, called New Radio) scenario, the terminal cannot determine the carrier frequency point to be detected through the measurement configuration of the NR base station, and the NR base station will always send NR candidate service frequency points to the terminal for detection, to determine whether there is IDC in these candidate service frequency points.

At present, the bandwidth supported by NR is greater than that supported by LTE, and can reach 100 MHz (for FR1 frequency band) or 400 MHz (for FR2 frequency band). When there is IDC, the IDC generally occurs in only part of the bandwidth. However, in the related art, the NR base station only sends the NR candidate service frequency points for the terminal to measure, not just the bandwidth that needs to be measured by the terminal, which results in that, during the process of NR IDC detection, it is impossible to accurately determine how much bandwidth the frequency point corresponds to has IDC, and the detection result is often to determine that IDC exists in the entire NR frequency band.

Figure 1:
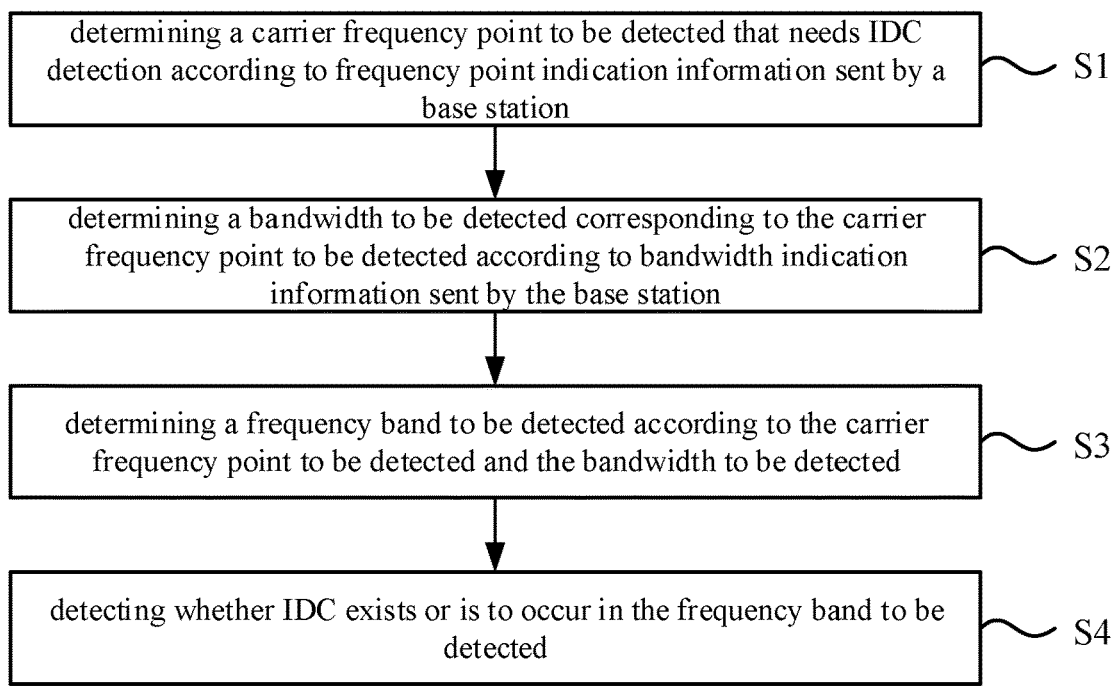
FIG. 1 is a schematic flowchart of a method for detecting IDC according to an embodiment of the present disclosure.

FIG. 1 is a schematic flowchart of a method for detecting IDC according to an embodiment of the present disclosure. The method for detecting IDC shown in this embodiment can be performed by a terminal, which includes but is not limited to an electronic device such as a mobile phone, a tablet computer, and a wearable device The terminal can be used as user equipment to communicate with a base station, and the base station may be a LTE base station, and may also be an NR base station.

As shown in FIG. 1, the method for detecting IDC may include the following steps.

In step S1, a carrier frequency point to be detected that needs IDC detection is determined according to frequency point indication information sent by the base station.

In step S2, a bandwidth to be detected corresponding to the carrier frequency point to be detected is determined according to bandwidth indication information sent by the base station.

In step S3, a frequency band to be detected is determined according to the carrier frequency point to be detected and the bandwidth to be detected.

In step S4, it is detected whether IDC exists or is to occur in the frequency band to be detected.

In an embodiment, the base station may send the frequency point indication information to the terminal, and the terminal may determine the carrier frequency point to be detected that needs the IDC detection according to the frequency point indication information.

When the frequency point indication information comes from the LTE base station, then the frequency point indication information may be the information about the frequency point in the measurement configuration in the related art. When the frequency point indication information comes from the NR base station, then the frequency point indication information may be the NR candidate service frequency point in the related art.

In addition to sending the frequency point indication information to the terminal, the base station can also send the bandwidth indication information to the terminal. According to the bandwidth indication information, the terminal can determine the bandwidth to be detected corresponding to the carrier frequency point to be detected, and then can determine the frequency band to be detected according to the carrier frequency point to be detected and the bandwidth to be detected, and then detects whether the IDC exists or is about to occur in the frequency band to be detected.

The carrier frequency point to be detected may be located at the starting position of the bandwidth to be detected, or at the end position of the bandwidth to be detected, or at the center of the bandwidth to be detected, which specifically, can be pre-agreed between the base station and the terminal.

For example, the carrier frequency point to be detected is x, the bandwidth to be detected is A, and the carrier frequency point to be detected is located at the beginning of the bandwidth to be detected, then the frequency band to be detected determined according to the carrier frequency point to be detected and the bandwidth to be detected is x to x+A, thereby detecting whether IDC exists or is about to occur for the frequency band x to x+A.

According to an embodiment of the present disclosure, in addition to sending the frequency point indication information to the terminal, the base station can also send the bandwidth indication information to the terminal, so that the terminal can determine the carrier frequency point to be detected for IDC detection according to the frequency point indication information, and determine the bandwidth to be detected corresponding to the carrier frequency point to be detected according to the bandwidth indication information, and then determine the frequency band to be detected according to the carrier frequency point to be detected and the bandwidth to be detected, so that the determined frequency band to be detected can be detected to determine whether IDC exists or is about to occur.

Since the base station sends the bandwidth indication information to the terminal, the terminal can be instructed to determine the specific bandwidth to be detected corresponding to the carrier frequency point, so that the terminal can detect the bandwidth to be detected in a targeted manner, without the need for the entire bandwidth of the frequency band where the carrier frequency point is located (for example, the carrier frequency point is a frequency point in the NR frequency band, then the entire bandwidth of the frequency band where the carrier frequency point is located is the bandwidth of the entire NR frequency band). The detection can be performed with a smaller granularity, so as to accurately determine which part of the bandwidth corresponding to the carrier frequency point has the IDC, which on one hand, reduces the bandwidth that needs to be detected by the terminal, and on the other hand, makes the IDC information reported by the terminal to the base station is more accurate, which is convenient for the base station to reasonably configure for the terminal according to the IDC information.

In an embodiment, the terminal can use the carrier network, such as 5G NR network, 4G LTE network, etc. to communicate, and can also use the network in other frequency bands, such as Wi-Fi, Bluetooth, GNSS (Global Navigation Satellite System) and other networks for communication. The Wi-Fi, Bluetooth, GNSS and other networks belong to the ISM (Industrial Scientific Medical) frequency band.

The frequency band to be detected is mainly the frequency band in the carrier network. When it is detected that there is mutual interference between the frequency band to be detected and the ISM frequency band, the IDC can be determined. When it is predicted that there will be mutual interference between the frequency band to be detected and the ISM frequency band, IDC can be predicted. For example, a time period may be preset, called a preset time period, and then it may be predicted whether IDC will occur on the terminal within the preset time period after the current moment. If IDC will occur on the terminal within the preset time period after the current moment, it is determined that IDC will occur.

It should be noted that when the terminal exists or is about to appear IDC, the terminal can first determine whether the existing or upcoming IDC can be solved by itself, and in the case that it cannot be solved by itself, the terminal can send information of the IDC to the base station. The information of the IDC can indicate to the base station that IDC exists or is about to occur in the frequency band to be detected, so that the base station can configure the terminal.

In addition, the carrier frequency point to be detected may include one frequency point, then the bandwidth to be detected may be one bandwidth, so that one frequency band to be detected can be determined. The carrier frequency point to be detected may include multiple frequency points, then the bandwidth to be detected may include multiple bandwidths. In this case, the base station can also send the correspondence relationship between the carrier frequency points to be detected and the bandwidths to be detected to the terminal. According to the correspondence relationship, the terminal can determine multiple sets of carrier frequency point to be detected and corresponding bandwidth to be detected, and then determine multiple frequency bands to be detected. The correspondence relationship is carried in the frequency point indication information or the bandwidth indication information, and may also be carried in other information.

Figure 2:
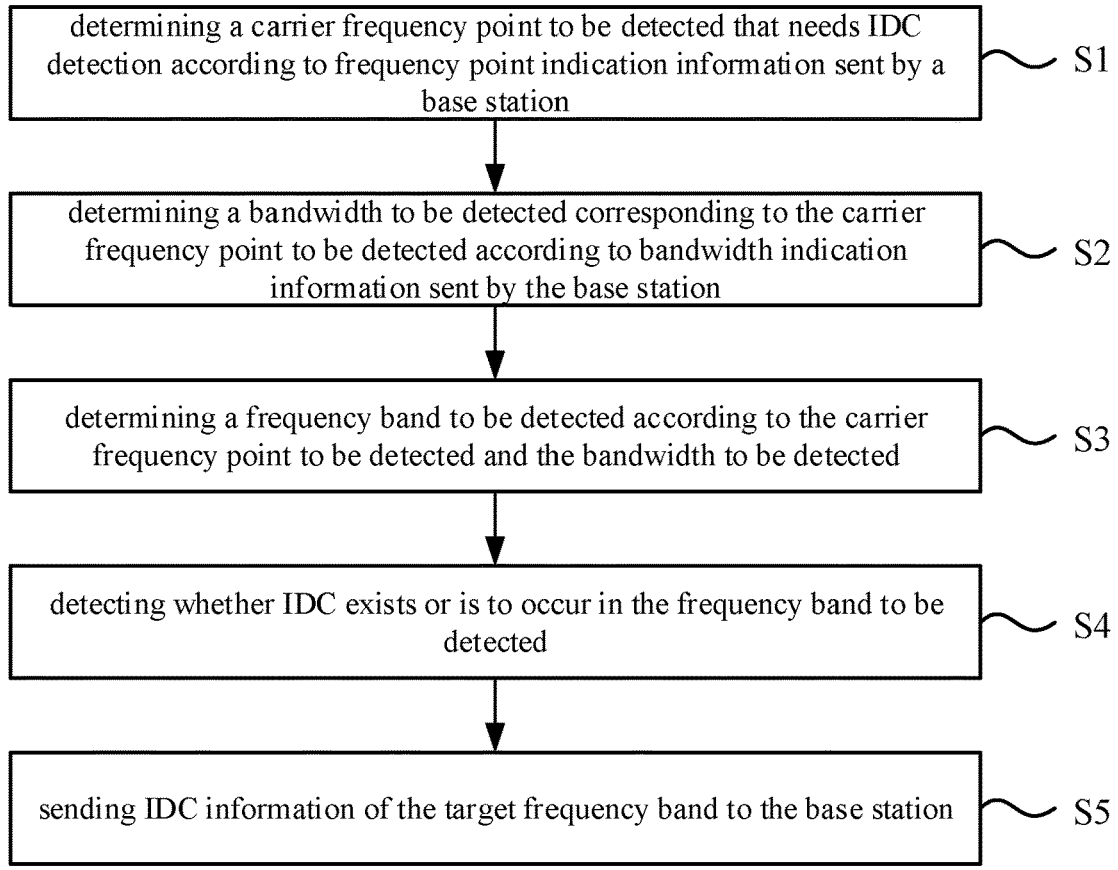
FIG. 2 is a schematic flowchart of another method for detecting IDC according to an embodiment of the present disclosure.

FIG. 2 is a schematic flowchart of another method for detecting IDC according to an embodiment of the present disclosure. As shown in FIG. 2, the frequency band where IDC exists or is to occur is a target frequency band, and the method further includes:

in step S5, sending IDC information of the target frequency band to the base station.

In an embodiment, the terminal determines the frequency band where the IDC exists or will occur as the target frequency band by detecting the frequency point to be detected, and can send the IDC information of the target frequency band to the base station. The IDC information may include information about the target frequency band (such as the start and end positions of the target frequency band), so that the base station can determine the frequency band where IDC exists or will occur as the target frequency band, and then configure the terminal to alleviate or eliminate the IDC problem existing in the terminal.

Optionally, the target frequency band is a part of the NR frequency band, and the IDC information includes a target carrier frequency point in the target frequency band and a target bandwidth corresponding to the target carrier frequency point.

In an embodiment, the target frequency band where the IDC is determined to exist may be a part of the NR frequency band, then the IDC information reported to the base station may include the target carrier frequency point in the target frequency band and the target bandwidth corresponding to the target carrier frequency point, so that the base station can determine the target frequency band according to the target carrier frequency point and the target bandwidth. For example, the target carrier frequency point is located at the starting position of the target bandwidth, then the determined target frequency band is from the target carrier frequency point to the target carrier frequency point plus the target bandwidth.

Optionally, the target frequency band is the entire NR frequency band, and the IDC information includes the target carrier frequency point in the target frequency band.

In an embodiment, the terminal may predetermine with the base station, when sending the IDC information to the base station when determining that the target frequency band where the IDC exists corresponds to the entire bandwidth of the frequency band where a certain carrier frequency point is located, the IDC information may only include the carrier frequency point. Then, when the terminal determines that the frequency band where the IDC exists is the entire NR frequency band, the IDC information sent to the base station may only include the target carrier frequency point.

By analyzing the IDC information, the base station only obtains the target carrier frequency point, but does not obtain the corresponding target bandwidth, and then can determine the frequency band where the target carrier frequency point is located, for example, the frequency band is the NR frequency band, and then can determine that IDC exists in the entire frequency band of the NR frequency band.

Optionally, the IDC information is configured to indicate whether the target frequency band is a frequency band causing interference or a frequency band affected by interference.

In an embodiment, the IDC information sent by the terminal to the base station may also indicate the direction of interference, that is, whether the target frequency band is the frequency band that causes interference or the frequency band that is interfered. For example, if the target frequency band causes interference to the ISM frequency band, then the target frequency band is the frequency band causing interference. For example, if the ISM frequency band causes interference to the target frequency band, the target frequency band is the frequency band affected by interference.

Optionally, the bandwidth indication information includes a start frequency and an end frequency of the bandwidth to be detected.

In an embodiment, the base station may directly indicate to the terminal the start frequency and end frequency of the bandwidth to be detected through the bandwidth indication information. The start frequency and the end frequency may be absolute frequencies, and the terminal can directly determine the frequency band to be detected according to the start frequency and the end frequency (that is, the frequency band from the start frequency to the end frequency is the frequency band to be detected), without considering the carrier frequency point to be detected.

Optionally, the bandwidth indication information includes a resource block and a subcarrier spacing.

In an embodiment, the base station may indicate the bandwidth to be detected to the terminal through the bandwidth indication information including the resource block (RBs) and subcarrier spacing (SCS), and the terminal can determine a bandwidth of the resource block (for example, 12 subcarrier spacings) according to the subcarrier spacing, as the bandwidth to be detected.

It should be noted that there are many ways for the base station to indicate the bandwidth to be detected to the terminal, which is not limited to that described in the above embodiment. For example, the bandwidth to be detected is a value of bandwidth, which is A, and the carrier frequency point to be detected x may be located at the starting position of the bandwidth to be detected, then the frequency band to be detected is the frequency band from x to x+A.

Optionally, the carrier frequency point to be detected is located at the beginning position of the bandwidth to be detected, or at the end position of the bandwidth to be detected, or at the center of the bandwidth to be detected.

In an embodiment, the carrier frequency point to be detected may be located at the starting position of the bandwidth to be detected, may also be located at the end position of the bandwidth to be detected, or may be located at the center of the bandwidth to be detected, which specifically may be predetermined by the terminal or the base station.

For example, the carrier frequency point to be detected is x, and the bandwidth to be detected is A. When the carrier frequency point to be detected is located at the starting position of the bandwidth to be detected, the frequency band to be detected is the frequency band from x to x+A. When the carrier frequency point to be detected is located at the end position of the bandwidth to be detected, the frequency band to be detected is the frequency band from x-A to x. When the carrier frequency point to be detected is located at the center of the bandwidth to be detected, the frequency band to be detected is from x−A/2 to x+A/2.

Figure 3:
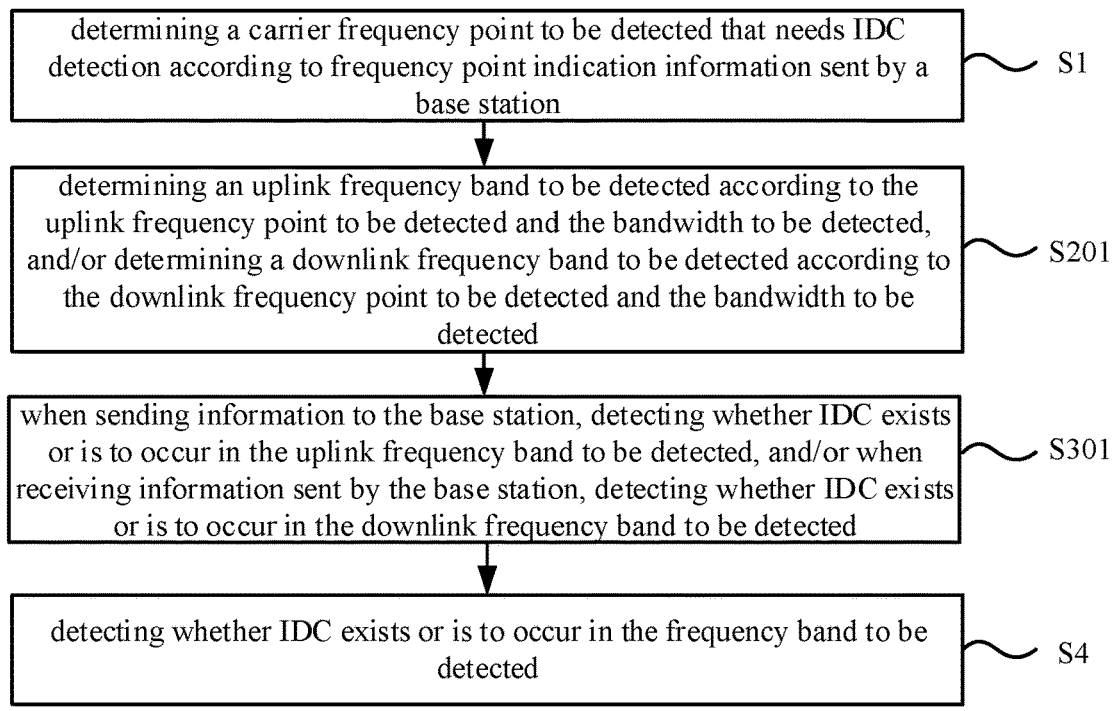
FIG. 3 is a schematic flowchart of yet another method for detecting IDC according to an embodiment of the present disclosure.

FIG. 3 is a schematic flowchart of yet another method for detecting IDC according to an embodiment of the present disclosure. As shown in FIG. 3, the carrier frequency point to be detected includes at least one of an uplink frequency point to be detected or a downlink frequency point to be detected, and determining the frequency band to be detected according to the carrier frequency point to be detected and the bandwidth to be detected, and detecting whether IDC exists or is about to occur in the frequency band to be detected includes steps S201 and S301.

In step S201, the uplink frequency band to be detected is determined according to the uplink frequency point to be detected and the bandwidth to be detected; or, the downlink frequency band to be detected is determined according to the downlink frequency point to be detected and the bandwidth to be detected; or, the uplink frequency band to be detected is determined according to the uplink frequency point to be detected and the bandwidth to be detected, and the downlink frequency band to be detected is determined according to the downlink frequency point to be detected and the bandwidth to be detected.

In step S301, when sending information to the base station, it is detected whether IDC exists or is to occur in the uplink frequency band to be detected; or, when receiving the information sent by the base station, it is detected whether IDC exists or is to occur in the downlink frequency band to be detected; or, when sending information to the base station, it is detected whether IDC exists or is to occur in the uplink frequency band to be detected, and when receiving the information sent by the base station, it is detected whether IDC exists or is to occur in the downlink frequency band to be detected.

In an embodiment, the operation of the terminal to detect whether IDC exists or is about to occur may be for uplink transmission (for example, whether there is IDC between the frequency band to be detected occupied by uplink transmission and the ISM frequency band), or for downlink transmission (for example, whether there is IDC between the frequency band to be detected occupied by downlink transmission and the ISM frequency band). The carrier frequency point to be detected indicated by the base station may include the uplink frequency point to be detected, and may also include the downlink frequency point to be detected.

The terminal can determine the uplink frequency band to be detected according to the uplink frequency point to be detected and the bandwidth to be detected, and can determine the downlink frequency band to be detected according to the downlink frequency point to be detected and the bandwidth to be detected. Then, when sending information to the base station (that is, during uplink transmission), the terminal can detect whether IDC exists or is about to occur in the uplink frequency band to be detected, or when receiving information sent by the base station (that is, during downlink transmission), the terminal can detect whether IDC exists or is about to occur in the downlink frequency band to be detected.

Accordingly, the base station indicates the uplink frequency point to be detected to the terminal, so that the terminal determines the uplink frequency band to be detected, and performs detection for the uplink frequency band to be detected, or indicates the downlink frequency point to be detected to the terminal, so that the terminal determines the downlink frequency band to be detected, and performs detection for the downlink frequency band to be detected. The uplink frequency point to be detected and the downlink frequency point to be detected may be different, so that the terminal can perform detection on different frequency bands during uplink transmission and downlink transmission.

When the carrier frequency point to be detected only includes one carrier frequency point, the terminal can determine the uplink frequency point to be detected and the downlink frequency point to be detected based on the frequency point.

Figure 4:
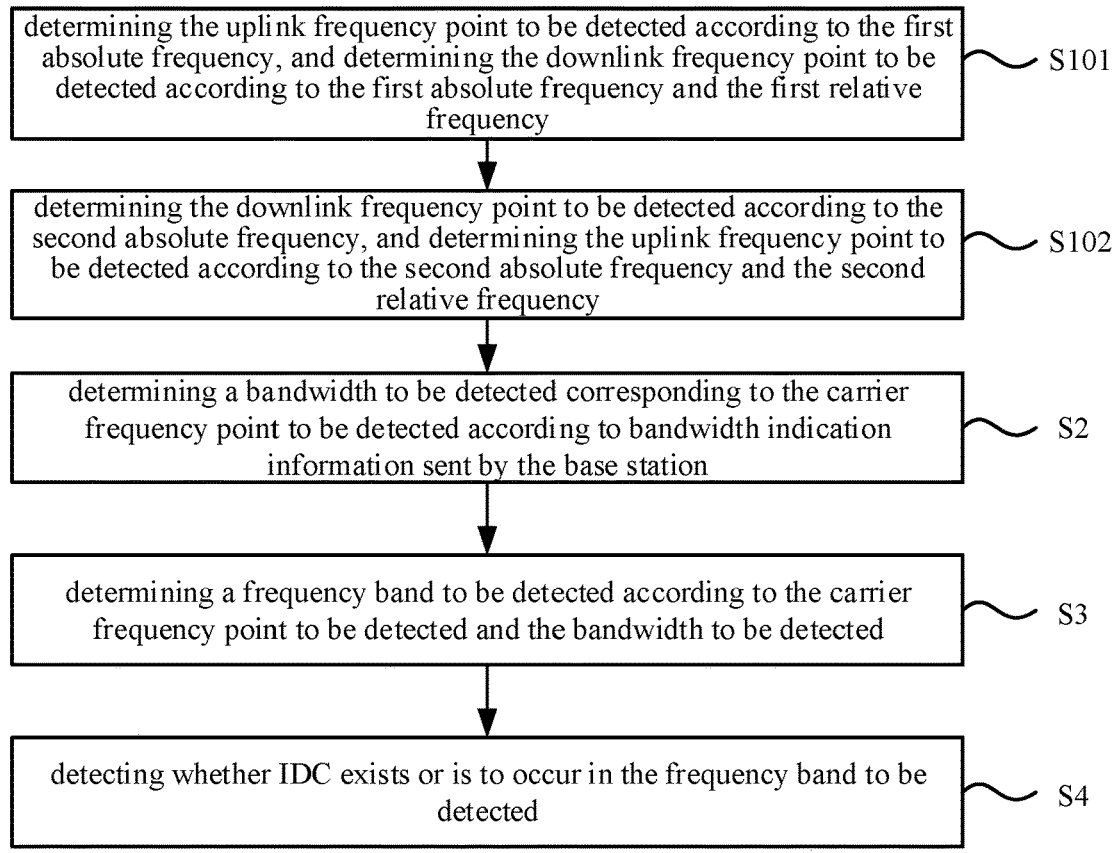
FIG. 4 is a schematic flowchart of still another method for detecting IDC according to an embodiment of the present disclosure.

FIG. 4 is a schematic flowchart of yet another method for detecting IDC according to an embodiment of the present disclosure. As shown in FIG. 4, the carrier frequency points to be detected include an uplink frequency point to be detected and a downlink frequency point to be detected.

The frequency point indication information includes a first absolute frequency and a first relative frequency, and determining the carrier frequency point to be detected that needs IDC detection according to the frequency point indication information sent by the base station includes:

in step S101, determining the uplink frequency point to be detected according to the first absolute frequency, and determining the downlink frequency point to be detected according to the first absolute frequency and the first relative frequency.

Or, the frequency point indication information includes a second absolute frequency and a second relative frequency, and determining the carrier frequency point to be detected that needs IDC detection according to the frequency point indication information sent by the base station includes:

in step S102, determining the downlink frequency point to be detected according to the second absolute frequency, and determining the uplink frequency point to be detected according to the second absolute frequency and the second relative frequency.

In an embodiment, the carrier frequency points to be detected indicated by the base station may include the uplink frequency point to be detected and the downlink frequency point to be detected.

The frequency point indication information may include the first absolute frequency and the first relative frequency. In this case, the terminal may determine the uplink frequency point to be detected according to the first absolute frequency, and determine the downlink frequency point to be detected according to the first absolute frequency and the first relative frequency (for example, adding the first relative frequency on the basis of the first absolute frequency).

Accordingly, by indicating the first absolute frequency to the terminal, the terminal can determine the uplink frequency point to be detected, and by indicating the first absolute frequency and the first relative frequency to the terminal, the terminal can determine the downlink frequency point to be detected.

The frequency point indication information may also include the second absolute frequency and the second relative frequency. In this case, the terminal can determine the downlink frequency point to be detected according to the second absolute frequency, and determine the uplink frequency point to be detected according to the second absolute frequency and the second relative frequency (for example, adding the second relative frequency on the basis of the second absolute frequency).

Accordingly, by indicating the second absolute frequency to the terminal, the terminal can determine the downlink frequency point to be detected, and by indicating the second absolute frequency and the second relative frequency to the terminal, the terminal can determine the uplink frequency point to be detected.

Figure 5:
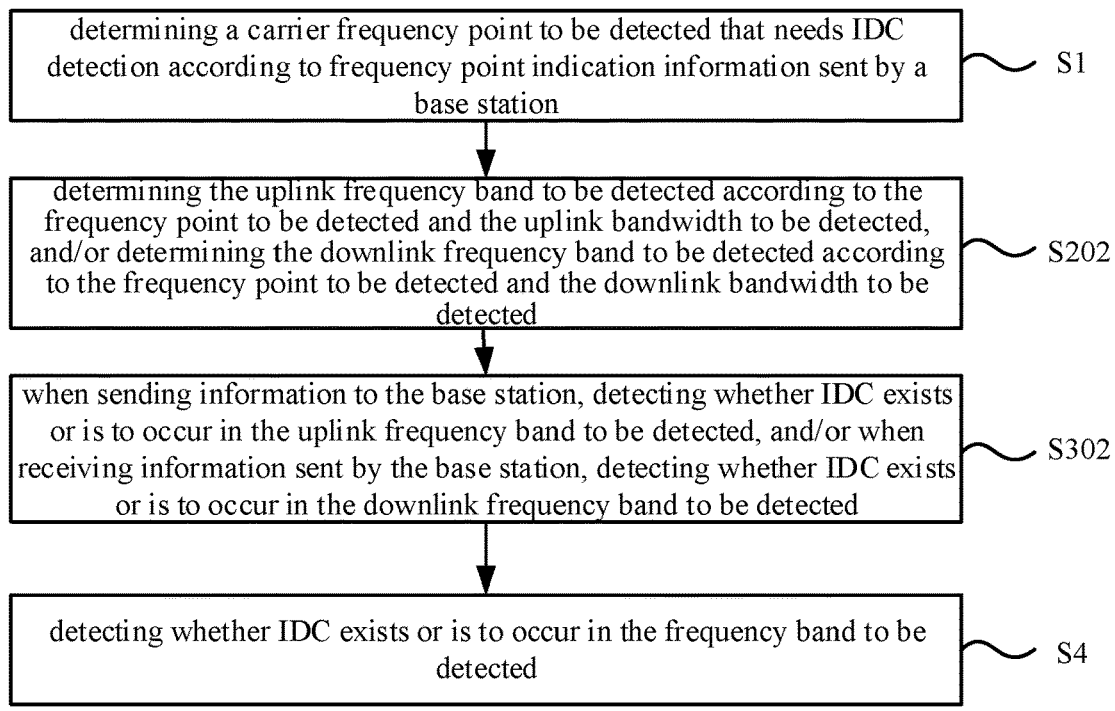
FIG. 5 is a schematic flowchart of still yet another method for detecting IDC according to an embodiment of the present disclosure.

FIG. 5 is a schematic flowchart of yet another method for detecting IDC according to an embodiment of the present disclosure. As shown in FIG. 5, the bandwidth to be detected includes at least one of an uplink bandwidth to be detected or a downlink bandwidth to be detected, and determining the frequency band to be detected according to the carrier frequency point to be detected and the bandwidth to be detected, and detecting whether IDC exists or is to occur in the frequency band to be detected includes steps S202 and S302.

In step S202, the uplink frequency band to be detected is determined according to the frequency point to be detected and the uplink bandwidth to be detected; or, the downlink frequency band to be detected is determined according to the frequency point to be detected and the downlink bandwidth to be detected; or, the uplink frequency band to be detected is determined according to the frequency point to be detected and the uplink bandwidth to be detected, and the downlink frequency band to be detected is determined according to the frequency point to be detected and the downlink bandwidth to be detected.

In step S302, when sending information to the base station, it is detected whether IDC exists or is to occur in the uplink frequency band to be detected; or, when receiving the information sent by the base station, detecting whether IDC exists or is to occur in the downlink frequency band to be detected; or, when sending information to the base station, it is detected whether IDC exists or is to occur in the uplink frequency band to be detected, and when receiving the information sent by the base station, detecting whether IDC exists or is to occur in the downlink frequency band to be detected.

In an embodiment, the operation of the terminal to detect whether IDC exists or is about to occur may be for uplink transmission (for example, whether there is IDC between the frequency band to be detected occupied by uplink transmission and the ISM frequency band), or for downlink transmission (for example, whether there is IDC between the frequency band to be detected occupied by downlink transmission and the ISM frequency band), and the bandwidth to be detected indicated by the base station may include the uplink bandwidth to be detected, and may also include the downlink bandwidth to be detected.

The terminal can determine the uplink frequency band to be detected according to the frequency point to be detected and the uplink bandwidth to be detected, and can determine the downlink frequency band to be detected according to the frequency point to be detected and the downlink bandwidth to be detected. Then, when sending information to the base station (that is, during uplink transmission), the terminal can detect whether IDC exists or is about to occur in the uplink frequency band to be detected, or when receiving information sent from the base station (that is, during downlink transmission), the terminal can detect whether IDC exists or is to occur in the downlink frequency band to be detected.

Accordingly, the base station indicates the uplink bandwidth to be detected to the terminal, so that the terminal determines the uplink frequency band to be detected, and performs detection for the uplink frequency band to be detected, or indicates the downlink bandwidth to be detected to the terminal, so that the terminal determines the downlink frequency band to be detected, and performs detection for the downlink frequency band to be detected. The uplink bandwidth to be detected and the downlink bandwidth to be detected may be different, so that the terminal can perform detection on different frequency bands during uplink transmission and downlink transmission.

When the bandwidth to be detected only includes one bandwidth, the terminal may determine the uplink bandwidth to be detected and the downlink bandwidth to be detected based on the bandwidth.

Optionally, when the carrier frequency point to be detected is a frequency point in the frequency band corresponding to the serving cell, the bandwidth indication information includes configuration information of bandwidth parts of the frequency band corresponding to the serving cell.

In an embodiment, since the bandwidth of the NR frequency band is relatively large, the NR frequency band can be divided into multiple bandwidth parts (BWP for short), and for the terminal, the base station can inform the terminal of the specific configuration of the bandwidth parts of the frequency band corresponding to the serving cell through the configuration information (for example, how many bandwidth parts the corresponding frequency of the serving cell contains, the center frequency point of each bandwidth part, the bandwidth size of each bandwidth part, etc.).

When the carrier frequency point to be detected is a frequency point in the frequency band corresponding to the serving cell (such as the serving cell where the terminal is currently located) (that is, the carrier frequency point to be detected is in the frequency band corresponding to the serving cell), the bandwidth indication information sent by the base station to the terminal may be included in the configuration information of the bandwidth parts of the frequency band corresponding to the serving cell, and the terminal can determine the bandwidth to be detected according to the configuration information, for example, the bandwidth of the bandwidth part corresponding to the serving cell can be used as the bandwidth to be detected.

Further, if the carrier frequency point to be detected is a frequency point in the frequency band corresponding to the serving cell, then the frequency point indication information may also be included in the configuration information, that is, the base station does not need to send the frequency point indication information and bandwidth indication information, but can indicate the carrier frequency point to be detected (for example, the terminal can use the center frequency point of the corresponding bandwidth part of the current serving cell or all serving cells as the carrier frequency point to be detected) and the bandwidth to be detected to the terminal through the configuration information.

If the carrier frequency point to be detected is not a frequency point in the frequency band corresponding to the serving cell, for example, is a frequency point in the frequency band corresponding to a non-serving cell, the base station can send the frequency point indication information and the bandwidth indication information to the terminal through separate information.

Optionally, the serving cell corresponds to multiple bandwidth parts, and the bandwidth to be detected is the sum of the bandwidths of the multiple bandwidth parts, or the sum of the bandwidths of some of the multiple bandwidth parts.

In an embodiment, if the carrier frequency point to be detected is a frequency point in the frequency band corresponding to the serving cell, and the serving cell corresponds to multiple bandwidth parts, the base station can carry the bandwidth indication information in the configuration information to send the configuration information to the terminal, and the terminal can determine the bandwidth to be detected according to the configuration information. Specifically, the terminal can determine the bandwidths of multiple bandwidth parts corresponding to the serving cell according to the configuration information, and then add the bandwidths of the multiple bandwidth parts as the bandwidth to be detected, or add the bandwidths of some of the bandwidth parts (specifically, which bandwidth parts among the multiple bandwidth parts may be pre-agreed by the terminal and the base station) as the bandwidth to be detected.

Optionally, the terminal is in an idle state or an inactive state, and the carrier frequency point to be detected is the frequency point at which the base station instructs the terminal to perform carrier measurement in the idle state or the inactive state.

In an embodiment, for the terminal in the idle state or the inactive state, the base station may instruct the terminal to perform carrier measurement (for example, to measure the carrier for the purpose of minimizing drive test, etc.), and the carrier indication information may be included in the instruction for instructing the terminal to perform carrier measurement. Accordingly, the terminal can determine the frequency band to be detected according to the frequency point to be detected for the carrier measurement.

Figure 6:
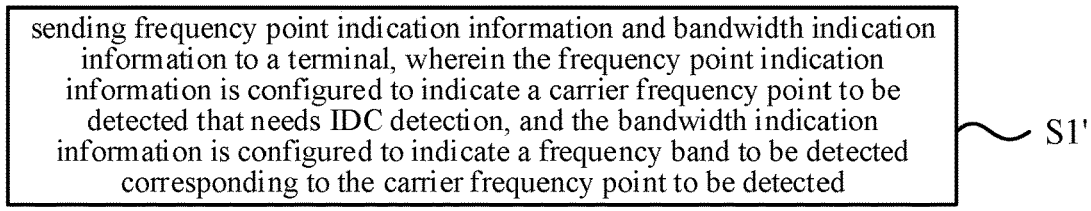
FIG. 6 is a schematic flowchart of a method for indicating IDC detection according to an embodiment of the present disclosure.

FIG. 6 is a schematic flowchart of a method for indicating IDC detection according to an embodiment of the present disclosure. The method for indicating IDC detection shown in this embodiment can be performed by a base station, and the base station can communicate with the terminal in the method for detecting IDC described in any of the above embodiments, and the terminal can communicate with the base station as a user equipment. The base station may be an LTE base station or an NR base station.

As shown in FIG. 6, the method for indicating IDC detection may include the following steps.

In step S1', frequency point indication information and bandwidth indication information is sent to the terminal. The frequency point indication information is configured to indicate the carrier frequency point to be detected that needs IDC detection, and the bandwidth indication information is configured to indicate the bandwidth to be detected corresponding to the carrier frequency point to be detected.

According to embodiments of the present disclosure, the base station can not only send the frequency point indication information to the terminal, but also can send the bandwidth indication information to the terminal, so that the terminal can determine the carrier frequency point to be detected for IDC detection according to the frequency point indication information, and determine the bandwidth to be detected corresponding to the carrier frequency point to be detected according to the bandwidth indication information, and further determines the frequency band to be detected according to the carrier frequency point to be detected and the bandwidth to be detected, so that the determined frequency band to be detected can be detected to determine whether IDC exists or is about to occur.

Since the base station sends the bandwidth indication information to the terminal, the terminal can be instructed to determine the specific bandwidth to be detected corresponding to the carrier frequency point, and then the terminal can detect the bandwidth to be detected in a targeted manner, without the need for the entire bandwidth of the frequency band where the carrier frequency point is located (for example, the carrier frequency point is a frequency point in the NR frequency band, then the entire bandwidth of the frequency band where the carrier frequency point is located is the bandwidth of the entire NR frequency band). The detection can be performed with a smaller granularity, so as to accurately determine which part of the bandwidth corresponding to the carrier frequency point has the IDC, which on one hand, reduces the bandwidth that needs to be detected by the terminal, and on the other hand, makes the IDC information reported by the terminal to the base station is more accurate, which is convenient for the base station to reasonably configure for the terminal according to the IDC information.

Figure 7:
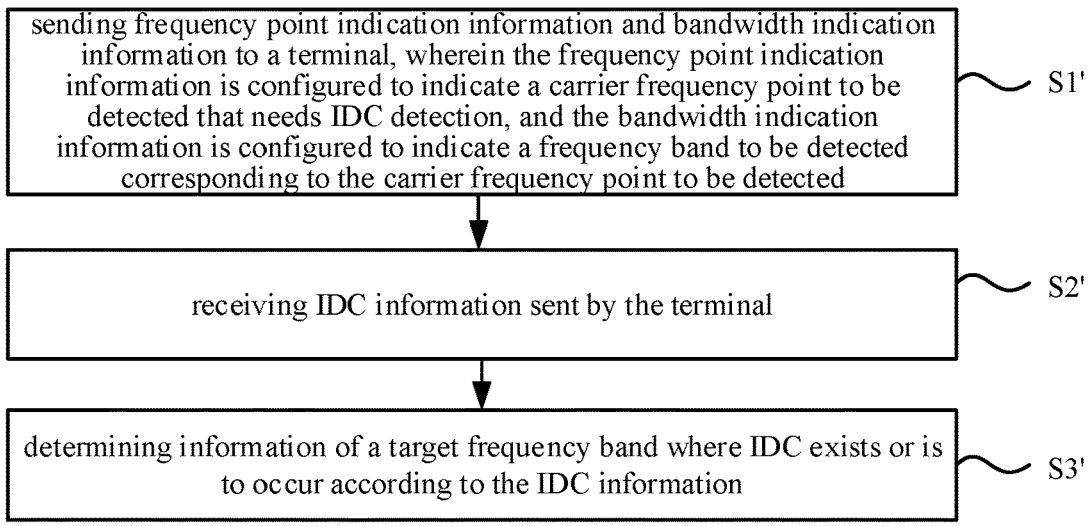
FIG. 7 is a schematic flowchart of another method for indicating IDC detection according to an embodiment of the present disclosure.

FIG. 7 is a schematic flowchart of another method for indicating IDC detection according to an embodiment of the present disclosure. As shown in FIG. 7, the method further includes:

in step S2', receiving IDC information sent by the terminal;

in step S3', determining information of a target frequency band where IDC exists or is to occur according to the IDC information.

In an embodiment, by detecting the frequency point to be detected, the terminal determines the frequency point where the IDC exists or is about to occur as the target frequency band, and can send the IDC information that the IDC exists in the target frequency band to the base station. The IDC information may include information related to the target frequency band (such as the start position and end position of the target frequency band). The base station can determine that the IDC exists in the target frequency band according to the information of the target frequency band, and further can configure the terminal to alleviate or eliminate the IDC problem existing in the terminal.

Optionally, the target frequency band is a part of the NR frequency band, and the information of the target frequency band includes a target carrier frequency point of the target frequency band and a target bandwidth corresponding to the target carrier frequency point.

In an implementation, the target frequency band determined to have IDC may be a part of the NR frequency band, then the IDC information received by the base station may include the target carrier frequency point of the target frequency band and the target bandwidth corresponding to the target carrier frequency point, and the base station can determine the target frequency band according to the target carrier frequency point and the target bandwidth. For example, the target carrier frequency point is located at the starting position of the target bandwidth, then the determined target frequency band is from the target carrier frequency point to the target carrier frequency point plus the target bandwidth.

Optionally, the target frequency band is the entire NR frequency band, and the IDC information includes the target carrier frequency point of the target frequency band.

In an embodiment, the terminal can pre-determine with the base station, when sending the IDC information to the base station in response to determining that the target frequency band where the IDC exists corresponds to the entire bandwidth of the frequency band where a certain carrier frequency point is located, the IDC information can only include the carrier frequency band. Then, when the terminal determines that the frequency band where the IDC exists is the entire NR frequency band, the IDC information sent to the base station may only include the target carrier frequency point.

By analyzing the IDC information, the base station only obtains the target carrier frequency point, but does not obtain the corresponding target bandwidth, and can determine the frequency band where the target carrier frequency point is located. For example, the frequency band where the target carrier frequency point is located is the NR frequency band, and it can be determined that the IDC exists in the entire NR frequency band.

Figure 8:
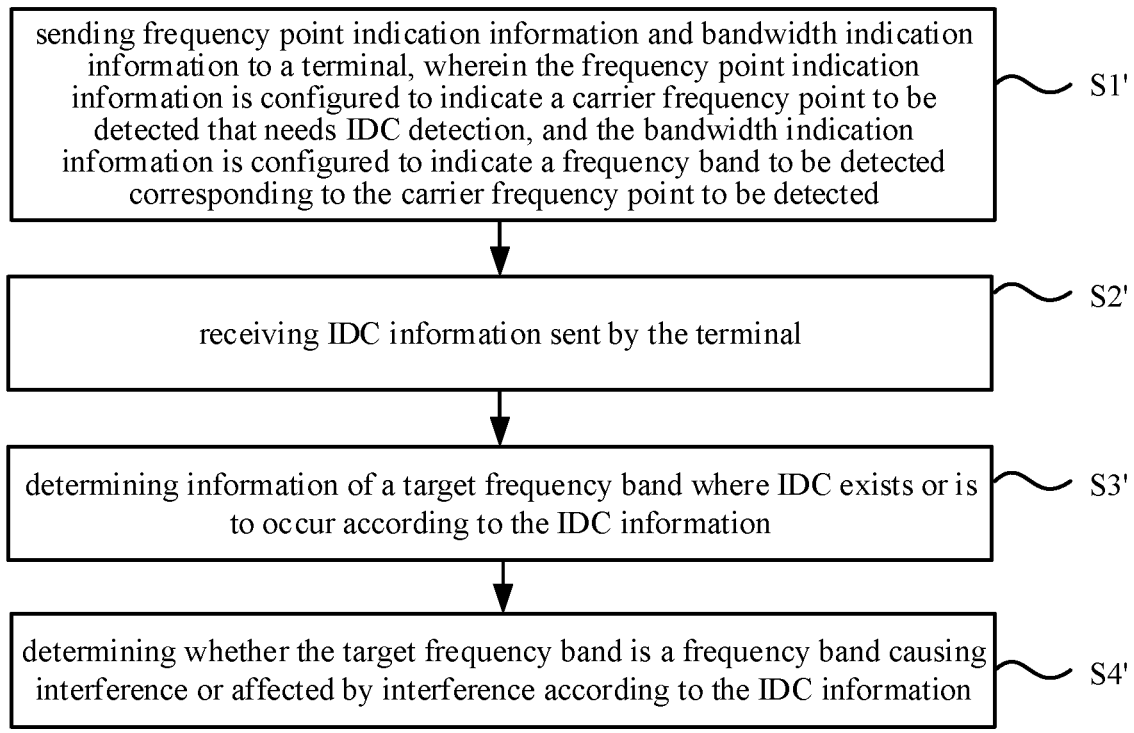
FIG. 8 is a schematic flowchart of yet another method for indicating IDC detection according to an embodiment of the present disclosure.

FIG. 8 is a schematic flowchart of yet another method for indicating IDC detection according to an embodiment of the present disclosure. As shown in FIG. 8, the method further includes:

in step S4', determining whether the target frequency band is a frequency band causing interference or affected by interference according to the IDC information.

In an embodiment, the base station can also determine the interference direction according to the received IDC information, that is, whether the target frequency band is the frequency band causing interference or affected by interference. For example, if the target frequency band causes interference to the ISM frequency band, then the target frequency band is the frequency band causing interference. For example, if the ISM frequency band causes interference to the target frequency band, the target frequency band is the interference-affected frequency band.

Optionally, the bandwidth indication information includes a start frequency and an end frequency of the bandwidth to be detected.

In an embodiment, the base station may directly indicate to the terminal the start frequency and end frequency of the bandwidth to be detected through the bandwidth indication information. The start frequency and the end frequency may be absolute frequencies, and the terminal can directly determine the frequency band to be detected according to the start frequency and the end frequency (that is, the frequency band from the start frequency to the end frequency is the frequency band to be detected), without considering the carrier frequency point to be detected.

Optionally, the bandwidth indication information includes a resource block and a subcarrier spacing.

In an embodiment, the base station may indicate the bandwidth to be detected to the terminal through the bandwidth indication information including the resource block and the subcarrier spacing, and the terminal may determine the bandwidth of the resource block (for example, 12 subcarrier spacings) as the bandwidth to be detected according to the subcarrier spacing.

It should be noted that there are many ways for the base station to indicate the bandwidth to be detected to the terminal, which is not limited to the content described in the above-mentioned embodiments. For example, the bandwidth to be detected is a value of a bandwidth, and the value is A. The carrier frequency point to be detected x may be located at the starting position of the bandwidth to be detected, then the frequency band to be detected is the frequency band from x to x+A.

Optionally, the carrier frequency point to be detected is located at the starting position of the bandwidth to be detected, or at the end position of the bandwidth to be detected, or at the center of the bandwidth to be detected.

In an embodiment, the carrier frequency point to be detected may be located at the starting position of the bandwidth to be detected, also may be located at the end position of the bandwidth to be detected, and may also be located at the center of the bandwidth to be detected, which may be specifically predetermined by the terminal and the base station.

For example, the carrier frequency point to be detected is x, and the bandwidth to be detected is A. When the carrier frequency point to be detected is located at the starting position of the bandwidth to be detected, the frequency band to be detected is the frequency band from x to x+A. When the carrier frequency point to be detected is located at the end position of the bandwidth to be detected, the frequency band to be detected is the frequency band from x−A to x. When the carrier frequency point to be detected is located at the center of the bandwidth to be detected, the frequency band to be detected is the frequency band from x−A/2 to x+A/2.

Optionally, the carrier frequency point to be detected includes at least one of an uplink frequency point to be detected or a downlink frequency point to be detected.

In an embodiment, the base station indicates the uplink frequency point to be detected to the terminal, so that the terminal determines the uplink frequency band to be detected, and detects the uplink frequency band to be detected, or indicates the downlink frequency point to be detected to the terminal, so that The terminal determines the downlink frequency band to be detected, and detects the downlink frequency band to be detected. The uplink frequency point to be detected and the downlink frequency point to be detected may be different, so that the terminal can perform detection on different frequency bands during uplink transmission and downlink transmission.

Optionally, the carrier frequency point to be detected includes the uplink frequency point to be detected and the downlink frequency point to be detected.

The frequency point indication information includes a first absolute frequency and a first relative frequency, or the frequency point indication information includes a second absolute frequency and a second relative frequency.

In an embodiment, by indicating the first absolute frequency to the terminal, the terminal can determine the uplink frequency point to be detected, and by indicating the first absolute frequency and the first relative frequency to the terminal, the terminal can determine the downlink frequency point to be detected. Alternatively, by indicating the second absolute frequency to the terminal, the terminal can determine the downlink frequency point to be detected, and by indicating the second absolute frequency and the second relative frequency to the terminal, the terminal can determine the uplink frequency point to be detected.

Optionally, the bandwidth to be detected includes at least one of an uplink bandwidth to be detected or a downlink bandwidth to be detected.

In an embodiment, the base station indicates the uplink bandwidth to be detected to the terminal, so that the terminal determines the uplink frequency band to be detected, and performs detection for the uplink frequency band to be detected, or indicates the downlink bandwidth to be detected to the terminal, so that the terminal determines the downlink frequency band to be detected, and performs detection for the downlink frequency band to be detected. The uplink bandwidth to be detected and the downlink bandwidth to be detected may be different, so that the terminal can perform detection on different frequency bands during uplink transmission and downlink transmission.

Optionally, if the carrier frequency point to be detected is a frequency point in the frequency band corresponding to the serving cell, the bandwidth indication information includes configuration information of the bandwidth parts of the frequency band corresponding to the serving cell.

In an embodiment, when the carrier frequency point to be detected is a frequency point in the frequency band corresponding to the serving cell (such as the serving cell where the terminal is currently located) (that is, the carrier frequency point to be detected is in the frequency band corresponding to the serving cell), the bandwidth indication information sent by the base station to the terminal may be included in the configuration information of the bandwidth parts of the frequency band corresponding to the serving cell, and the terminal can determine the bandwidth to be detected according to the configuration information, for example, the bandwidth of the bandwidth part corresponding to the serving cell can be used as the bandwidth to be detected.

Optionally, the serving cell corresponds to multiple bandwidth parts, and the bandwidth to be detected is the sum of the bandwidths of the multiple bandwidth parts, or the sum of the bandwidths of some of the multiple bandwidth parts.

In an embodiment, if the carrier frequency point to be detected is a frequency point in the frequency band corresponding to the serving cell, and the serving cell corresponds to multiple bandwidth parts, the base station can carry the bandwidth indication information in the configuration information to send the configuration information to the terminal, and the terminal can determine the bandwidth to be detected according to the configuration information. Specifically, the terminal can determine the bandwidths of multiple bandwidth parts corresponding to the serving cell according to the configuration information, and then add the bandwidths of the multiple bandwidth parts as the bandwidth to be detected, or add the bandwidths of some of the bandwidth parts (specifically, which bandwidth parts among the multiple bandwidth parts may be pre-agreed by the terminal and the base station) as the bandwidth to be detected.

Optionally, the carrier frequency point to be detected is the frequency point at which the base station instructs the terminal to perform carrier measurement in an idle state or an inactive state.

In an embodiment, for the terminal in the idle state or the inactive state, the base station may instruct the terminal to perform carrier measurement (for example, to measure the carrier for the purpose of minimizing drive test, etc.), and the carrier indication information may be included in the instruction for instructing the terminal to perform carrier measurement. Accordingly, the terminal can determine the frequency band to be detected according to the frequency point to be detected for the carrier measurement. Corresponding to the foregoing embodiments of the method for detecting IDC and the method for indicating IDC detection, the present disclosure also provides embodiments of an apparatus for detecting IDC and an apparatus for indicating IDC detection.

Figure 9:
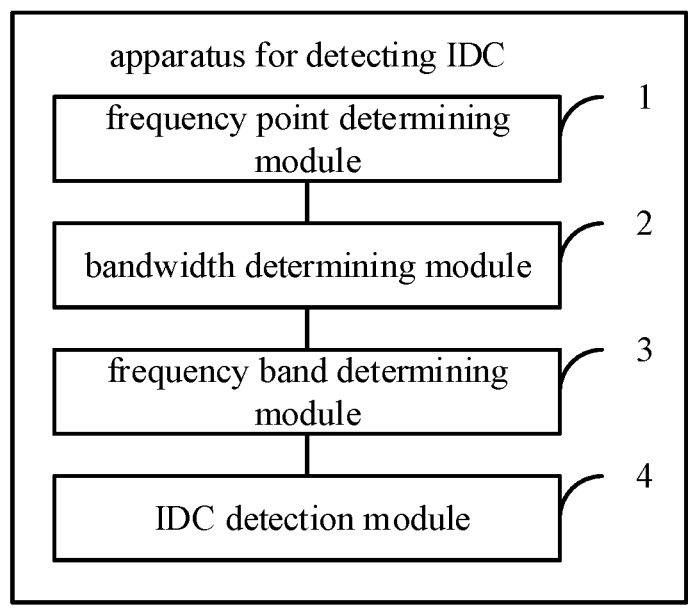
FIG. 9 is a block diagram of an apparatus for detecting IDC according to an embodiment of the present disclosure.

FIG. 9 is a schematic block diagram of an apparatus for detecting IDC according to an embodiment of the present disclosure. The apparatus for detecting IDC shown in this embodiment can be performed by a terminal, which includes but is not limited to an electronic device such as a mobile phone, a tablet computer, and a wearable device. The terminal can be used as user equipment to communicate with a base station, and the base station may be an LTE base station, and may also be an NR base station.

As shown in FIG. 9, the apparatus for detecting IDC may include a frequency point determining module 1, a bandwidth determining module 2, a frequency band determining module 3 and an IDC detection module 4.

The frequency point determining module 1 is configured to determine a carrier frequency point to be detected that needs IDC detection according to frequency point indication information sent by the base station.

The bandwidth determining module 2 is configured to determine a bandwidth to be detected corresponding to the carrier frequency point to be detected according to bandwidth indication information sent by the base station.

The frequency band determining module 3 is configured to determine a frequency band to be detected according to the carrier frequency point to be detected and the bandwidth to be detected.

The IDC detection module 4 is configured to detect whether IDC exists or is to occur in the frequency band to be detected.

Figure 10:
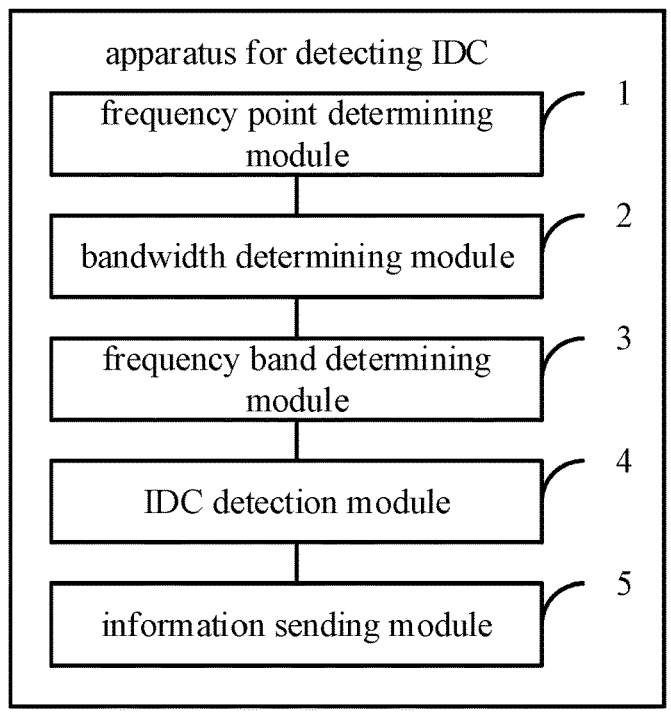
FIG. 10 is a block diagram of another apparatus for detecting IDC according to an embodiment of the present disclosure.

FIG. 10 is a schematic block diagram of another apparatus for detecting IDC according to an embodiment of the present disclosure. As shown in FIG. 10, the target frequency band where IDC exists or is to occur is the target frequency band, and the apparatus further includes an information sending module 5.

The information sending module 5 is configured to send IDC information of the target frequency band to the base station.

Optionally, the target frequency band is a part of the NR frequency band, and the IDC information includes a target carrier frequency point of the target frequency band and a target bandwidth corresponding to the target carrier frequency point.

Optionally, the target frequency band is the entire NR frequency band, and the IDC information includes the target carrier frequency point of the target frequency band.

Optionally, the IDC information is configured to indicate whether the target frequency band is a frequency band causing interference or affected by interference.

Optionally, the bandwidth indication information includes a start frequency and an end frequency of the bandwidth to be detected.

Optionally, the bandwidth indication information includes a resource block and a subcarrier spacing.

Optionally, the carrier frequency point to be detected is located at the starting position of the bandwidth to be detected, or at the end position of the bandwidth to be detected, or at the center of the bandwidth to be detected.

Optionally, the carrier frequency point to be detected includes at least one of an uplink frequency point to be detected or a downlink frequency point to be detected. The frequency band determining module is configured to perform at least one of: determining an uplink frequency band to be detected according to the uplink frequency point to be detected and the bandwidth to be detected, or determining the downlink frequency band to be detected according to the downlink frequency point to be detected and the bandwidth to be detected. The IDC detection module is configured to perform at least one of: when the terminal sends information to the base station, detecting whether IDC exists or is to occur in the uplink frequency band to be detected, or when the terminal receives information sent by the base station, detecting whether IDC exists or is to occur in the downlink frequency band to be detected.

Optionally, the carrier frequency point to be detected includes an uplink frequency point to be detected and a downlink frequency point to be detected.

The frequency point indication information includes a first absolute frequency and a first relative frequency, and the frequency point determining module is configured to determine the uplink frequency point to be detected according to the first absolute frequency, and determine the downlink frequency point to be detected according to the first absolute frequency and the first relative frequency.

Alternatively, the frequency point indication information includes a second absolute frequency and a second relative frequency, and the frequency point determining module is configured to determine the downlink frequency point to be detected according to the second absolute frequency, determine the uplink frequency point to be detected according to the second absolute frequency and the second relative frequency.

Optionally, the bandwidth to be detected includes at least one of an uplink bandwidth to be detected or a downlink bandwidth to be detected. The frequency band determining module is configured to perform at least one of determining the uplink frequency band to be detected according to the frequency point to be detected and the uplink bandwidth to be detected, or determining the downlink frequency band to be detected according to the frequency point to be detected and the downlink bandwidth to be detected. The IDC detection module is configured to perform at least one of: when the terminal sends information to the base station, detecting whether IDC exists or is to occur in the uplink frequency band to be detected; or when the terminal receives information sent by the base station, detecting whether IDC exists or is to occur in the downlink frequency band to be detected.

Optionally, if the carrier frequency point to be detected is a frequency point in the frequency band corresponding to the serving cell, the bandwidth indication information includes configuration information of bandwidth part of the frequency band corresponding to the serving cell.

Optionally, the serving cell corresponds to multiple bandwidth parts, and the bandwidth to be detected is the sum of bandwidths of the multiple bandwidth parts, or the sum of the bandwidths of some of the multiple bandwidth parts.

Optionally, the terminal is in an idle state or an inactive state, and the carrier frequency point to be detected is a frequency point at which the base station instructs the terminal to perform carrier measurement in the idle state or the inactive state.

Figure 11:
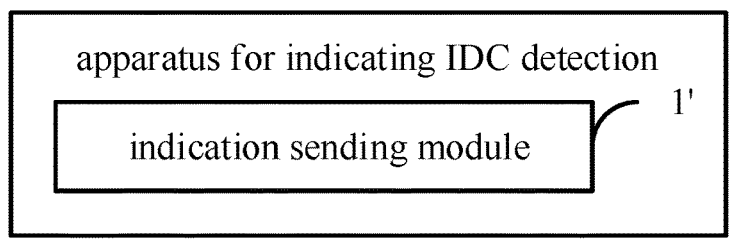
FIG. 11 is a block diagram of an apparatus for indicating IDC detection according to an embodiment of the present disclosure.

FIG. 11 is a schematic block diagram of an apparatus for indicating IDC detection according to an embodiment of the present disclosure. The apparatus for indicating IDC detection shown in this embodiment can be performed by a base station, and the base station can communicate with the terminal in the method for detecting IDC described in any of the above embodiments. The terminal can communicate with the base station as a user equipment. The base station may be an LTE base station or an NR base station.

As shown in FIG. 11, the apparatus for indicating IDC detection may include an indication sending module 1'.

The indication sending module 1' is configured to send frequency point indication information and bandwidth indication information to terminal. The frequency point indication information is configured to indicate a carrier frequency point to be detected that needs IDC detection, and the bandwidth indication information is configured to indicate a bandwidth to be detected corresponding to the carrier frequency point to be detected.

Figure 12:
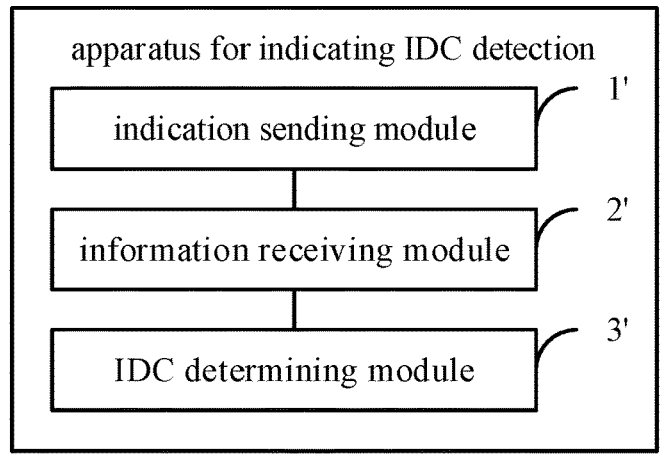
FIG. 12 is a block diagram of another apparatus for indicating IDC detection according to an embodiment of the present disclosure.

FIG. 12 is a schematic block diagram of another apparatus for indicating IDC detection according to an embodiment of the present disclosure. As shown in FIG. 12, the apparatus further includes an information receiving module 2' and an IDC determining module 3'.

The information receiving module 2' is configured to receive IDC information sent by the terminal.

The IDC determining module 3' is configured to determine, according to the IDC information, information of a target frequency band where IDC exists or is about to occur.

Optionally, the target frequency band is a part of the NR frequency band, and the information of the target frequency band includes a target carrier frequency point of the target frequency band and a target bandwidth corresponding to the target carrier frequency point.

Optionally, the target frequency band is the entire NR frequency band, and the information of the IDC includes the target carrier frequency point of the target frequency band.

Figure 13:
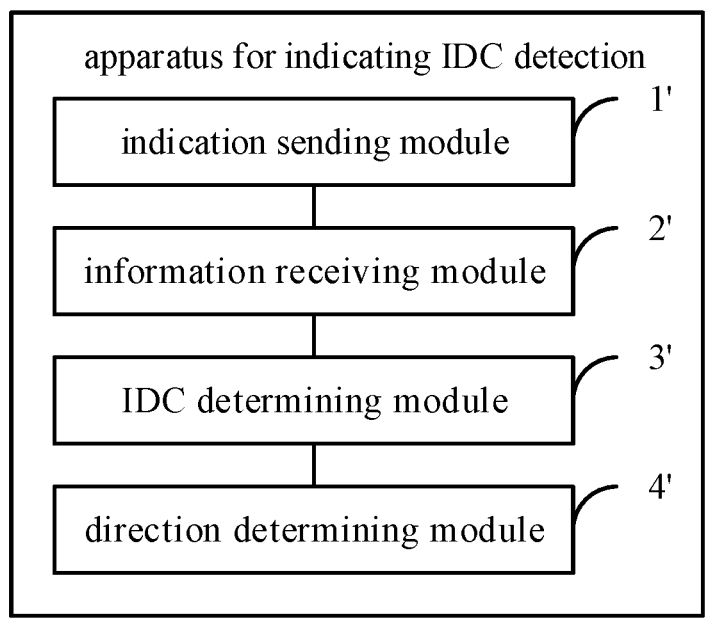
FIG. 13 is a block diagram of yet another apparatus for indicating IDC detection according to an embodiment of the present disclosure.

FIG. 13 is a schematic block diagram of yet another apparatus for indicating IDC detection according to an embodiment of the present disclosure. As shown in FIG. 13, the apparatus further includes a direction determining module 4'.

The direction determining module 4' is configured to determine, according to the IDC information, whether the target frequency band is a frequency band causing interference or affected by interference.

Optionally, the bandwidth indication information includes a start frequency and an end frequency of the bandwidth to be measured.

Optionally, the bandwidth indication information includes a resource block and a subcarrier spacing.

Optionally, the carrier frequency point to be detected is located at the starting position of the bandwidth to be detected, or at the end position of the bandwidth to be detected, or at the center of the bandwidth to be detected.

Optionally, the carrier frequency point to be detected includes at least one of an uplink frequency point to be detected or a downlink frequency point to be detected.

Optionally, the carrier frequency point to be detected includes an uplink frequency point to be detected and a downlink frequency point to be detected.

The frequency point indication information includes a first absolute frequency and a first relative frequency, or the frequency point indication information includes a second absolute frequency and a second relative frequency.

Optionally, the bandwidth to be measured includes at least one of an uplink bandwidth to be detected or a downlink bandwidth to be detected.

Optionally, if the carrier frequency point to be detected is a frequency point in the frequency band corresponding to the serving cell, the bandwidth indication information includes the configuration information of the bandwidth part of the frequency band corresponding to the serving cell.

Optionally, the serving cell corresponds to multiple bandwidth parts, and the bandwidth to be detected is the sum of the bandwidths of the multiple bandwidth parts, or the sum of the bandwidths of some of the multiple bandwidth parts.

Optionally, the carrier frequency point to be detected is the frequency point at which the base station instructs the terminal to perform carrier measurement in an idle state or an inactive state.

Regarding the apparatus in the above embodiments, the specific manner in which each module performs operations has been described in detail in the embodiments of the method, and will not be described in detail here.

With regard to the apparatus embodiments, since they basically correspond to the method embodiments, reference may be made to the partial descriptions of the method embodiments for relevant parts. The apparatus embodiments described above are only illustrative, wherein the modules described as separate components may or may not be physically separated, and the components shown as modules may or may not be physical modules, that is, they may be located in one place, or may be distributed over multiple network modules. Some or all of the modules may be selected according to actual needs to achieve the purpose of the solution in this embodiment. Those of ordinary skill in the art can understand and implement it without creative effort.

An embodiment of the present disclosure also provides an electronic device, including:
a processor; and
a memory configured to store instructions executable by the processor.

The processor is configured to implement the method for detecting IDC described in any of the above embodiments.

An embodiment of the present disclosure also provides an electronic device, including:
a processor; and
a memory configured to store instructions executable by the processor.

The processor is configured to implement the method for indicating IDC detection described in any of the above embodiments.

Figure 14:
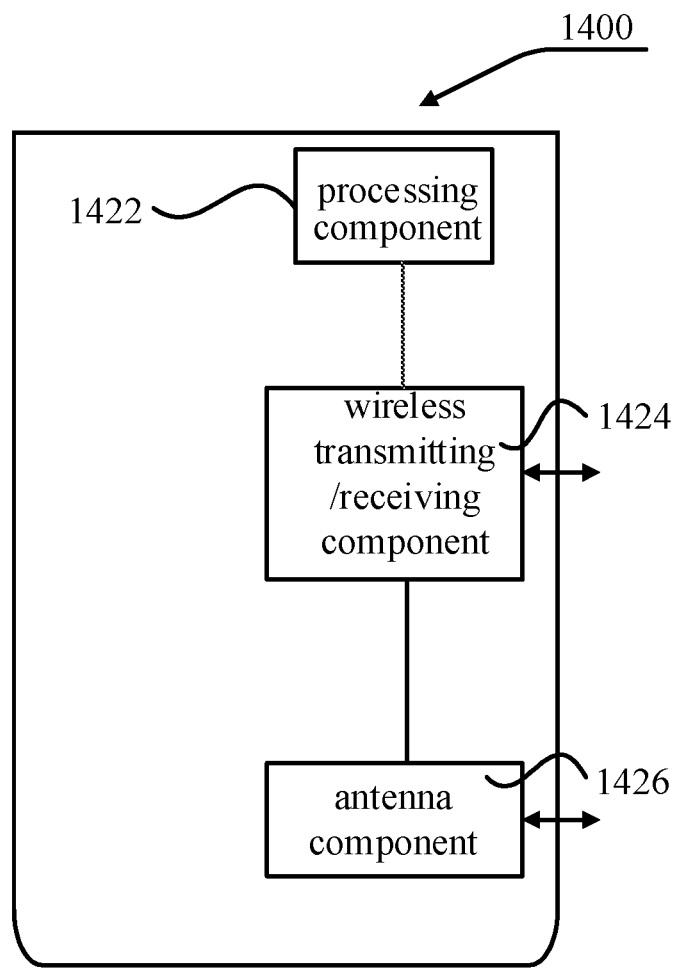
FIG. 14 is a block diagram of an apparatus for indicating IDC detection according to an embodiment of the present disclosure.

FIG. 14 is a schematic block diagram of an apparatus 1400 for indicating IDC detection according to an embodiment of the present disclosure. As show in FIG. 14, the apparatus 1400 may be provided as a base station. 14. Referring to FIG. 14, the apparatus 1400 includes a processing component 1422, a wireless transmitting/receiving component 1424, an antenna component 1426, and a signal processing part specific to a wireless interface, and the processing component 1422 may further include one or more processors. One of the processors in the processing component 1422 may be configured to implement the method for indicating IDC detection described in any of the foregoing embodiments.

Figure 15:
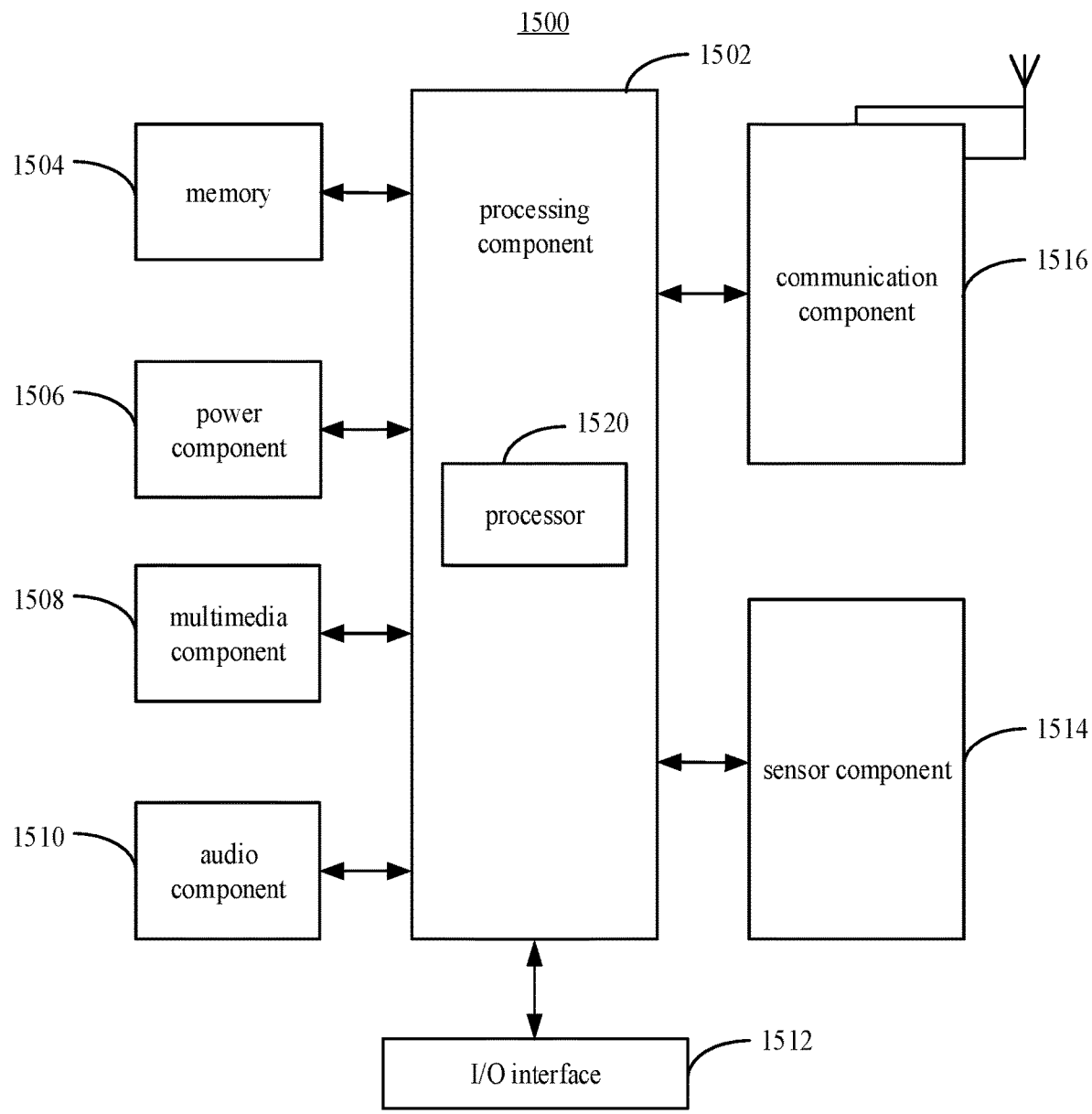
FIG. 15 is a block diagram of an apparatus for detecting IDC according to an embodiment of the present disclosure.

FIG. 15 is a schematic block diagram of an apparatus 1500 for detecting I DC according to an embodiment of the disclosure. For example, the apparatus 1 500 may be a mobile phone, a computer, a digital broadcasting terminal, a mess age transceiver device, a game console, a tablet device, a medical device, a fitness device and a personal digital assistant.

As illustrated in FIG. 15, the apparatus 1500 may include one or more of the following components: a processing component 1502, a memory 1504, a power component 1506, a multimedia component 1508, an audio component 1510, an input/output (I/O) interface 1512, a sensor component 1514, and a communication component 1516.

The processing component 1502 generally controls overall operation of the apparatus 1500, such as the operations associated with display, telephone calls, data communications, camera operations, and recording operations. The processing component 1502 may include one or more processors 1520 to execute instructions to perform all or part of the steps in the above described method. Moreover, the processing component 1502 may include one or more modules which facilitate the interaction between the processing component 1502 and other components. For instance, the processing component 1502 may include a multimedia module to facilitate the interaction between the multimedia component 1508 and the processing component 1502.

The memory 1504 is configured to store various types of data to support the operation of the apparatus 1500. Examples of such data include instructions for any applications or methods operated on the apparatus 1500, contact data, phonebook data, messages, pictures, video, etc. The memory 1504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1506 provides power to various components of the apparatus 1500. The power component 1506 may include a power management system, one or more power sources, and any other components associated with the generation, management, and distribution of power in the apparatus 1500.

The multimedia component 1508 includes a screen providing an output interface between the apparatus 1500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1508 includes a front-facing camera and/or a rear-facing camera. When the apparatus 1500 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 1510 is configured to output and/or input audio signals. For example, the audio component 1510 includes a microphone (MIC) configured to receive an external audio signal when the apparatus 1500 is in an operation mode, such as a call mode, a recording mode, and a voice recognition mode. The received audio signal may be further stored in the memory 1504 or transmitted via the communication component 1516. In some embodiments, the audio component 1510 further includes a speaker to output audio signals.

The I/O interface 1512 provides an interface between the processing component 1502 and peripheral interface modules, such as a keyboard, a click wheel, buttons, and the like. The buttons may include, but are not limited to, a home button, a volume button, a starting button, and a locking button.

The sensor component 1514 includes one or more sensors to provide status assessments of various aspects of the apparatus 1500. For instance, the sensor component 1514 may detect an open/closed status of the apparatus 1500, relative positioning of components, e.g., the display and the keypad, of the apparatus 1500, a change in position of the apparatus 1500 or a component of the apparatus 1500, a presence or absence of user contact with the apparatus 1500, an orientation or an acceleration/deceleration of the apparatus 1500, and a change in temperature of the apparatus 1500. The sensor component 1514 may include a proximity sensor configured to detect the presence of nearby objects without any physical contact. The sensor component 1514 may also include a light sensor, such as a CMOS or CCD image sensor, for use in imaging applications. In some embodiments, the sensor component 1514 may also include an accelerometer sensor, a gyroscope sensor, a magnetic sensor, a pressure sensor, or a temperature sensor.

The communication component 1516 is configured to facilitate communication, wired or wirelessly, between the apparatus 1500 and other devices. The apparatus 1500 can access a wireless network based on a communication standard, such as WiFi, 2G, or 3G, or a combination thereof. In an exemplary embodiment, the communication component 1516 receives a broadcast signal or broadcast associated information from an external broadcast management system via a broadcast channel. In an exemplary embodiment, the communication component 1516 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the apparatus 1500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In exemplary embodiments, there is also provided a non-transitory computer readable storage medium including instructions, such as included in the memory 1504, executable by the processor 1520 in the apparatus 1500, for performing the above method. For example, the non-transitory computer-readable storage medium may be a ROM, a RAM, a CD-ROM, a magnetic tape, a floppy disc, an optical data storage device, and the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure is only limited by the appended claims.

It should be noted that in this document, relational terms such as first and second are used only to distinguish one entity or operation from another, and do not necessarily require or imply that there is any such actual relationship or sequence between these entities or operations. The terms "comprising", "including" or any other variation thereof are intended to encompass non-exclusive inclusion such that a process, method, article or device comprising a list of elements includes not only those elements, but also other not expressly listed elements, or also include elements inherent to such a process, method, article or apparatus. Without further limitation, an element qualified by the phrase "comprising a . . . " does not preclude the presence of additional identical elements in a process, method, article or apparatus that includes the element.

The methods and devices provided by the embodiments of the present disclosure have been described in detail above. Specific examples are used to illustrate the principles and implementations of the present disclosure. The descriptions of the above embodiments are only used to help understand the method and its core idea of the present disclosure; at the same time, for those skilled in the art, according to the idea of the present disclosure, there will be changes in the specific implementation and application scope. In conclusion, the contents of this specification should not be construed as limiting the present disclosure.

What is claimed is:

1. A method for detecting in-device coexistence (IDC), performed by a terminal, the method comprising:
   determining a carrier frequency point to be detected that needs IDC detection in a new radio (NR) frequency band according to frequency point indication information sent by a base station;
   determining a bandwidth to be detected corresponding to the carrier frequency point to be detected according to bandwidth indication information sent by the base station; wherein the bandwidth indication information comprises the bandwidth to be detected, wherein the carrier frequency point to be detected is at a center of the bandwidth to be detected;
   determining a frequency band to be detected according to the carrier frequency point to be detected and the bandwidth to be detected;
   detecting whether IDC exists or is to occur in the frequency band to be detected;
   wherein the frequency band in which the IDC exists or is to occur is a target frequency band, and the method further comprises:
   sending IDC information of the target frequency band to the base station,
   wherein the target frequency band is a part of the NR frequency band, and the IDC information comprises a target carrier frequency point in the target frequency band and a target bandwidth corresponding to the target carrier frequency point;
   wherein the carrier frequency point to be detected comprises an uplink frequency point to be detected and a downlink frequency point to be detected;

the frequency point indication information comprises a first absolute frequency and a first relative frequency, and determining the carrier frequency point to be detected comprises:
   determining the uplink frequency point to be detected according to the first absolute frequency, and determining the downlink frequency point to be detected by adding the first relative frequency on the basis of the first absolute frequency;
or,
the frequency point indication information comprises a second absolute frequency and a second relative frequency, and determining the carrier frequency point to be detected comprises:
   determining the downlink frequency point to be detected according to the second absolute frequency, and determining the uplink frequency point to be detected by adding the second relative frequency on the basis of the second absolute frequency.

2. The method of claim 1, wherein the IDC information is configured to indicate whether the target frequency band is a frequency band causing interference or affected by interference.

3. The method of claim 1, wherein in a case that the carrier frequency point to be detected is in a frequency band corresponding to a serving cell, the bandwidth indication information comprises configuration information of bandwidth parts of the frequency band corresponding to the serving cell;
   wherein the serving cell corresponds to multiple bandwidth parts, and the bandwidth to be detected is a sum of bandwidths of the multiple bandwidth parts, or a sum of bandwidths of some of the multiple bandwidth parts.

4. The method of claim 1, wherein the terminal is in an idle state or an inactive state, and the carrier frequency point to be detected is a frequency point at which the base station instructs the terminal to perform carrier measurement in the idle state or in the inactive state.

5. The method of claim 1, wherein the carrier frequency point to be detected is x, and the bandwidth to be detected is A, and the frequency band to be detected is from x−A/2 to x+A/2.

6. The method of claim 1, wherein there are at least two bandwidths to be detected, and the method further comprises:
   receiving a correspondence between the uplink frequency point to be detected, the downlink frequency point to be detected, and the at least two bandwidths to be detected;
   determines an uplink bandwidth to be detected and a downlink bandwidth to be detected according to the correspondence; and
   determining an uplink frequency band to be detected according to the uplink frequency point to be detected and the uplink bandwidth to be detected, and determining a downlink bandwidth frequency band according to the downlink frequency point to be detected and the downlink bandwidth to be detected.

7. The method of claim 1, wherein there is only one bandwidth to be detected, and the method further comprises:
   determining an uplink frequency band to be detected according to the uplink frequency point to be detected and the bandwidth to be detected, and determining a downlink bandwidth frequency band according to the downlink frequency point to be detected and the bandwidth to be detected.

8. A method for indicating IDC detection, performed by a base station, the method comprising:
   sending frequency point indication information and bandwidth indication information to a terminal, wherein the frequency point indication information is configured to indicate a carrier frequency point to be detected that needs IDC detection in a new radio (NR) frequency band, and the bandwidth indication information comprises a bandwidth to be detected corresponding to the carrier frequency point to be detected; wherein the carrier frequency point to be detected is at a center of the bandwidth to be detected;
   receiving IDC information sent by the terminal; and
   determining information of a target frequency band where IDC exists or is to occur according to the IDC information;
   wherein the target frequency band is a part of the NR frequency band, and the information of the target frequency band comprises a target carrier frequency point in the target frequency band and a target bandwidth corresponding to the target carrier frequency point;
   wherein the carrier frequency point to be detected comprises an uplink frequency point to be detected and a downlink frequency point to be detected;
   the frequency point indication information comprises a first absolute frequency and a first relative frequency, wherein the first absolute frequency is used by the terminal to determine the uplink frequency point, while the first relative frequency is added to the first absolute frequency by a terminal to determine the downlink frequency point; or
   the frequency point indication information comprises a second absolute frequency and a second relative frequency; wherein the second absolute frequency is used by the terminal to determine the downlink frequency point, wherein the second relative frequency is added to the second absolute frequency by the terminal to determine the uplink frequency point.

9. The method of claim 8, further comprising:
   determining whether the target frequency band is a frequency band causing interference or affected by interference according to the IDC information.

10. A base station, comprising:
a processor; and
a memory configured to store instructions executable by a processor; wherein,
the processor is configured to implement the method for indicating IDC detection according to claim 8.

11. A terminal, comprising:
a processor;
a memory configured to store instructions executable by a processor; wherein,
the processor is configured to:
determine a carrier frequency point to be detected that needs IDC detection in a new radio (NR) frequency band according to frequency point indication information sent by a base station;
determine a bandwidth to be detected corresponding to the carrier frequency point to be detected according to bandwidth indication information sent by the base station;
wherein the bandwidth indication information comprises the bandwidth to be detected, wherein the carrier frequency point to be detected is at a center of the bandwidth to be detected;

determine a frequency band to be detected according to the carrier frequency point to be detected and the bandwidth to be detected;

detect whether IDC exists or is to occur in the frequency band to be detected;

wherein the frequency band in which the IDC exists or is to occur is a target frequency band, and the processor is further configured to:

send IDC information of the target frequency band to the base station, wherein the target frequency band is a part of an NR frequency band, and the IDC information comprises a target carrier frequency point in the target frequency band and a target bandwidth corresponding to the target carrier frequency point;

wherein the carrier frequency point to be detected comprises an uplink frequency point to be detected and a downlink frequency point to be detected;

the frequency point indication information comprises a first absolute frequency and a first relative frequency, and determining the carrier frequency point to be detected comprises:

determining the uplink frequency point to be detected according to the first absolute frequency, and determining the downlink frequency point to be detected by adding the first relative frequency on the basis of the first absolute frequency;

or, the frequency point indication information comprises a second absolute frequency and a second relative frequency, and determining the carrier frequency point to be detected comprises:

determining the downlink frequency point to be detected according to the second absolute frequency, and determining the uplink frequency point to be detected by adding the second relative frequency on the basis of the second absolute frequency.

12. The terminal of claim 11, wherein the IDC information is configured to indicate whether the target frequency band is a frequency band causing interference or affected by interference.

* * * * *